United States Patent
Hoeing

(10) Patent No.: US 7,762,678 B2
(45) Date of Patent: Jul. 27, 2010

(54) LOW-GLARE REAR-VIEW MIRROR FOR VEHICLES

(75) Inventor: Thomas Hoeing, Roding (DE)

(73) Assignee: Flabeg GmbH & Co. KG, Furth Im Wald (DE)

( * ) Notice: Subject to any disclaimer, the term of this patent is extended or adjusted under 35 U.S.C. 154(b) by 477 days.

(21) Appl. No.: 11/569,033

(22) PCT Filed: May 12, 2005

(86) PCT No.: PCT/EP2005/005167
§ 371 (c)(1),
(2), (4) Date: Jul. 6, 2007

(87) PCT Pub. No.: WO2005/111671
PCT Pub. Date: Nov. 24, 2005

(65) Prior Publication Data
US 2008/0019006 A1 Jan. 24, 2008

(30) Foreign Application Priority Data
May 12, 2004 (DE) .................. 10 2004 023 932

(51) Int. Cl.
G02B 5/08 (2006.01)
G02B 7/182 (2006.01)

(52) U.S. Cl. ...................... 359/883; 359/584

(58) Field of Classification Search .................. 359/584, 359/585, 586, 883
See application file for complete search history.

(56) References Cited

U.S. PATENT DOCUMENTS

| | | | | |
|---|---|---|---|---|
| 5,019,458 A * | 5/1991 | Elgat et al. | ................... | 428/630 |
| 5,159,490 A * | 10/1992 | Amano et al. | ............... | 359/584 |
| 5,267,081 A * | 11/1993 | Pein | ........................... | 359/584 |
| 5,510,173 A * | 4/1996 | Pass et al. | ................... | 428/216 |
| 6,078,425 A * | 6/2000 | Wolfe et al. | ................. | 359/584 |
| 6,128,126 A * | 10/2000 | Hohenegger et al. | ........ | 359/360 |
| 7,156,533 B2 * | 1/2007 | Hoeing | ........................ | 359/883 |
| 7,445,348 B2 * | 11/2008 | Shimada et al. | ............. | 359/883 |

FOREIGN PATENT DOCUMENTS

| | | |
|---|---|---|
| DE | 197 390 46 | 5/1999 |
| EP | 0176935 | 4/1986 |
| EP | 0438646 | 7/1991 |
| JP | 60 212706 | 10/1985 |
| JP | 62 108207 | 5/1987 |
| JP | 02 178603 | 7/1990 |

\* cited by examiner

Primary Examiner—Ricky D Shafer
(74) Attorney, Agent, or Firm—Leydig, Voit & Mayer, Ltd.

(57) ABSTRACT

An improved low-glare motor-vehicle mirror is realized by providing it with a multilayer coating comprising the following layers, in the order of their deposition: a transparent metallic layer; a first dielectric layer; a second dielectric layer with a lower refractive index than that of the first dielectric layer, and a metallic reflecting layer.

15 Claims, 2 Drawing Sheets

LOW-GLARE REAR-VIEW MIRROR FOR VEHICLES

The present invention relates to a rearview mirror for vehicles, in particular for motor vehicles or the like, with a transparent layer carrier, preferably consisting of soda-lime glass, and a coating on the front and/or rear side made from dielectric and metallic materials, the mirror having a low glaring effect due to its reflectance, in particular at night.

BACKGROUND

Typical known coatings for automobile mirrors consist of the highly reflecting metals silver and aluminium. The reflection values achievable amount to more than 85% in the visible light spectrum. Although, however, high reflection values are desirable in the daylight, they lead at night to a glaring of the driver through the headlights of the following vehicles. Therefore, mirror coatings were developed in the past, which are destined to reduce the glaring effect when driving at night.

One possibility of reducing the glare is the use of alternative reflector materials, such as chromium or titanium chromium (double-layer system of chromium on titanium, see DE 197 390 46). With this, mirrors with a neutral reflection and a reduced reflectance of approx. 45% to 60% can be realized. A further reduction is impossible at present, due to statutory provisions, which prescribe a minimum reflection of 40% in the daylight. The use of such alternative reflector materials is, furthermore, desirable for reasons of cost and for reasons of environmental protection. Namely, conventional reflecting layers made of silver usually require expensive anticorrosive measures, for example the application of protective varnish or the like, in order to guarantee a reliable reflection effect under all conditions of application. In particular in view of the materials used in such protective varnishes, it is, therefore, desirable to provide alternative materials for the reflecting layer.

Abandoning these conceptions, it was, however, tried afterwards to improve the behavior of the mirrors through spectrally selective reflection coatings. EP 0 176 935 B1, for example, describes a blue rearview mirror with reduced reflection in the green to red spectral region. This is based on the assumption that such mirrors have a low glaring effect at night, because the spectral composition of the light of the headlights usual at the moment of application of the patent EP 0 176 935 B1 had a high red contribution and a low blue contribution, so that such blue mirrors additionally diminished the (glaring) light of these headlights.

To evaluate the spectral properties of the mirror coatings, one must in general take into account that the response of the human eye differs greatly within the visible spectral region. This is represented by the so-called response characteristic $V(\lambda)$, $\lambda$, designating the wavelength of the light. $V(\lambda)$ is valid, however, only for the bright adaptation of the eye. With decreasing brightness of the environment, this characteristic shifts towards shorter wavelengths up to the dark-adapted response characteristic $V'(\lambda)$. Therefore, making use of these findings concerning the brightness response of the human eye, another approach for the development of low-glare mirrors were mirrors which, at a relatively high level of spectral reflectance, reduced in particular the region of the highest eye responsiveness at wavelengths of approx. 550 nm (U.S. Pat. No. 4,921,331, U.S. Pat. No. 4,805,989 and U.S. Pat. No. 4,955,705). In this case, coatings with dielectric multi-layer systems were developed, which altogether show a relatively high level of spectral reflectance, the manufacture of which is, however, relatively expensive, in particular in view of the materials used and the consumption of material, and which do not offer any possibilities for a specific color adaptation or color shading.

With an alternative technology to be mentioned here, one tried to reduce the risk of glaring through the headlights of following vehicles by means of the fact that the mirror structure contains parts of variable transmission, switched, e.g., electrically (e.g. electrochromic mirrors or LCD mirrors). The before-mentioned technologies involve, however, a high expenditure. They require in particular measures of circuit technology to ensure that the low reflection values achievable with them are only effective in concrete cases of acute glare. Accordingly, only vehicles from the top segment are equipped with them at present.

The optimum reduction of glare is made even more difficult through the fact that meanwhile other light sources to be used in motor-vehicle headlights were developed, which spectrally differ clearly from the known light sources (halogen headlights) and which complicate the relations.

SUMMARY OF THE INVENTION

An object of the present invention is to provide an improved rearview mirror, which, in particular with a low glaring effect through following vehicles (with different headlight structures), enables the use of alternative reflector materials with a lower reflection, in particular in comparison with silver or aluminium, with little manufacturing expenditure.

The present invention provides a rearview mirror with a transparent layer carrier, preferably consisting of soda-lime glass, which is provided with a multilayer coating comprising the following layers, in the order of their deposition:

a) a transparent metallic layer,
b) a first dielectric layer,
c) a second dielectric layer with a lower refractive index than that of the first dielectric layer,
d) a metallic reflecting layer.

Advantageous embodiments of the invention are the subject matter of the claims.

The present invention is based on the consideration that for a combined observation of different, possibly incompatible design targets, the mirror coating should be conceived with a sufficiently high number of degrees of freedom, contrary to the actually existing requirement of keeping the layer structure as simple as possible. For this purpose, it is provided, on the one hand, to enable the use of alternative reflector materials through a dielectric multilayer system of a suitable structure, which is situated in front of the reflector material and which guarantees a sufficiently high reflection effect for these applications. On the other hand, a transparent metallic thin layer is provided, in order to enable a color variation of the entire system, to specifically influence the latter's spectral reflection properties and to specifically reduce the manufacturing expenditure in view of a reduced material requirement.

Advantageously, the rearview mirror is specifically designed for application in the area of motor vehicles also in view of its characteristic reflection values. To guarantee an altogether sufficiently high reflection effect, the reflectance $R(A)$ with illuminant A is at least 40%, in another advantageous embodiment, at least 50%. In order to avoid, on the other hand, a glare of the driver through a globally too high reflection, the reflectance $R(A)$ with illuminant A is in an alternative or additional advantageous embodiment maximally 70%.

The multilayer structure of the dielectric enables the use of alternative reflector materials. Advantageously, the reflecting layer consists of nickel (Ni), titanium (Ti), chromium (Cr) or of an alloy of these materials, but preferably of Cr.

The transparent metallic layer preferably consists of NiCr and has a thickness of 1 to 21 nm. By chosing such a thickness, it is guaranteed that, on the one hand, the metallic layer has a sufficiently high transparency for the intended application, and that, on the other hand, an area resistance can be achieved, which is suitable for the reflection properties of the metallic layer desired in view of the superposition with the reflections on the reflecting layer.

The first dielectric layer preferably consists of $TiO_2$ or, in a particularly advantageous development, of $SnO_2$. Advantageously, the additional dielectric layer consist of $MgF_2$ or preferably of $SnO_2$.

Particularly good results can be achieved by designing the optical properties of the rearview minor according to a so-called design wavelength, which is particularly well adapted to the response characteristic of the eye, both for photopic and for scotopic vision. A wavelength of approx. 530 nm was chosen as a particularly well suited design wavelength, corresponding to an intermediate value between the maxima of the response characteristic for photopic vision, on the one hand, and for scotopic vision, on the other hand. To guarantee a particularly well suited adaptation of the layer system to this design wavelength, the layer thicknesses of the dielectric double layer are preferably chosen in a suitable manner. This is achieved by the fact that the sum of the thicknesses of the first and second dielectric layers amounts to maximally 250 nm.

The coating is advantageously applied on the rear side of the layer carrier, so that it is protected by the layer carrier against damage or other detrimental effects from the exterior. In another advantageous embodiment, the front of the layer carrier is provided with a hydrophilic and/or photocatalytically active coating, which prevents an undesired fogging up in a manner known in itself.

Advantageously, the rearview mirror is of a colored design, for example to guarantee low-glare properties in view of the illuminants typically used in motor-vehicles lighting or else in view of design specifications, its color coordinates $a_0$, $b_0$ fulfilling the condition $C=\sqrt{(a_0^2+b_0^2)}>5$, according to CIE. The definition is based on the color coordinates L, a and b in the so-called L a b color space, usually used for the quantitative and/or qualitative characterization of color properties, specified by the international lighting commission (commission internationale de l'éclairage CIE). The color coordinates characteristic for the rearview mirror are determined on the one hand with perpendicular light incidence ($L_0$, $a_0$, $b_0$) on the rearview mirror, the parameter C being a measure for the colorfulness of the system.

BRIEF DESCRIPTION OF THE DRAWINGS

One embodiment of the invention is illustrated by a drawing in which.

DETAILED DESCRIPTION

Figure 1:
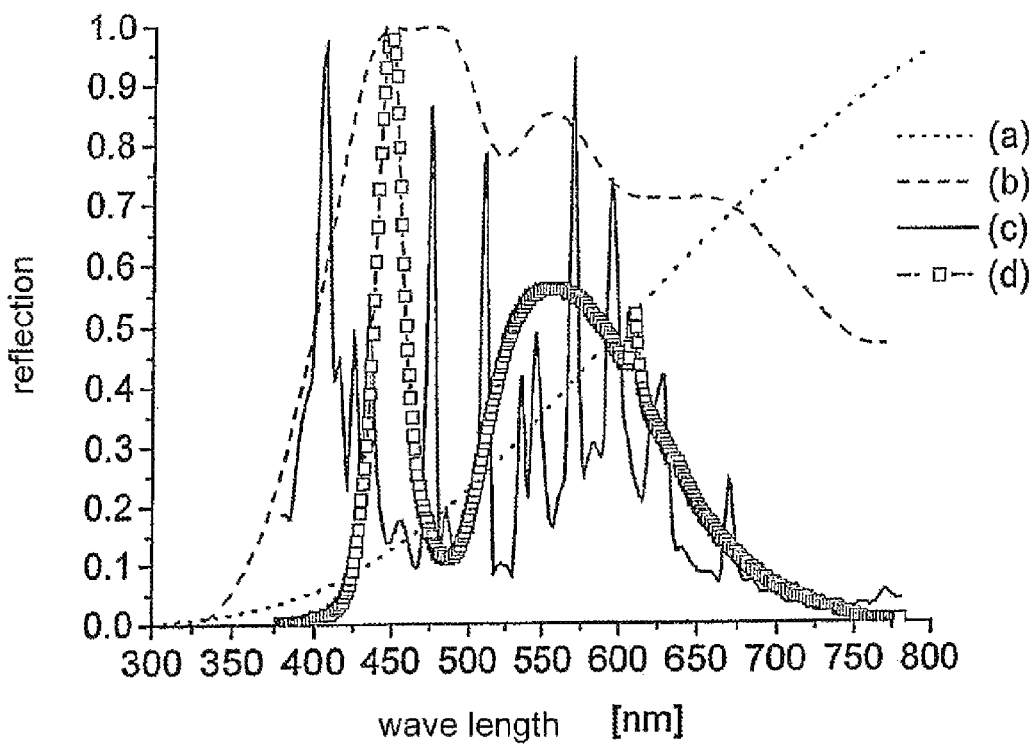
FIG. 1 shows the spectral course of a halogen lamp (illuminant A), of daylight (illuminant C), of a high-pressure discharge lamp and of a white LED.

FIG. 1 shows the development of the spectra of different light sources in the past. While up to recent times, only the illuminants C (daylight) and A (at night) were relevant, the spectral conditions for driving at night have become more complex due to the development of new light sources (discharge lamp HID and white light-emitting diodes LED). In FIG. 1, the spectra are designated with (a) illuminant A, (b) illuminant C, (c) discharge lamp, and (d) white light-emitting diode.

Figure 2:
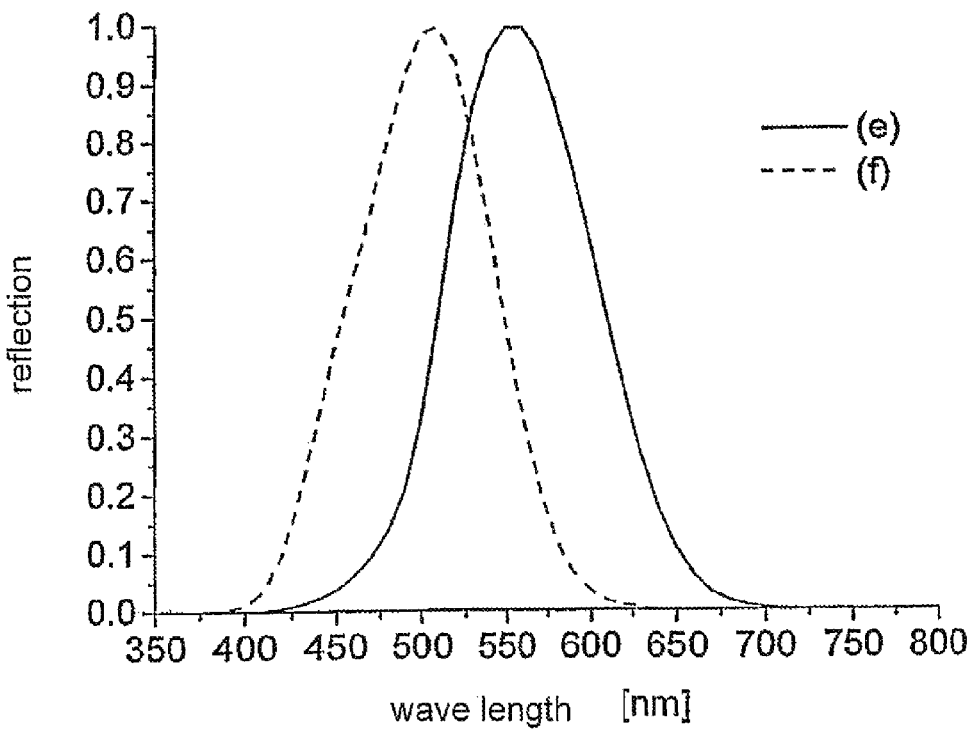
FIG. 2 shows the photopic and scotopic response characteristic.

FIG. 2 illustrates that the human eye is first of all highly responsive within a narrow range only and that, therefore, this range is mainly relevant for examinations concerning the glare. It can also be seen that the response characteristic of scotopic vision (at night) shifts towards shorter wavelengths. The response characteristics (e) "photopic vision" and (f) "scotopic vision" correspond to the standard CIE 1951.

Figure 3:
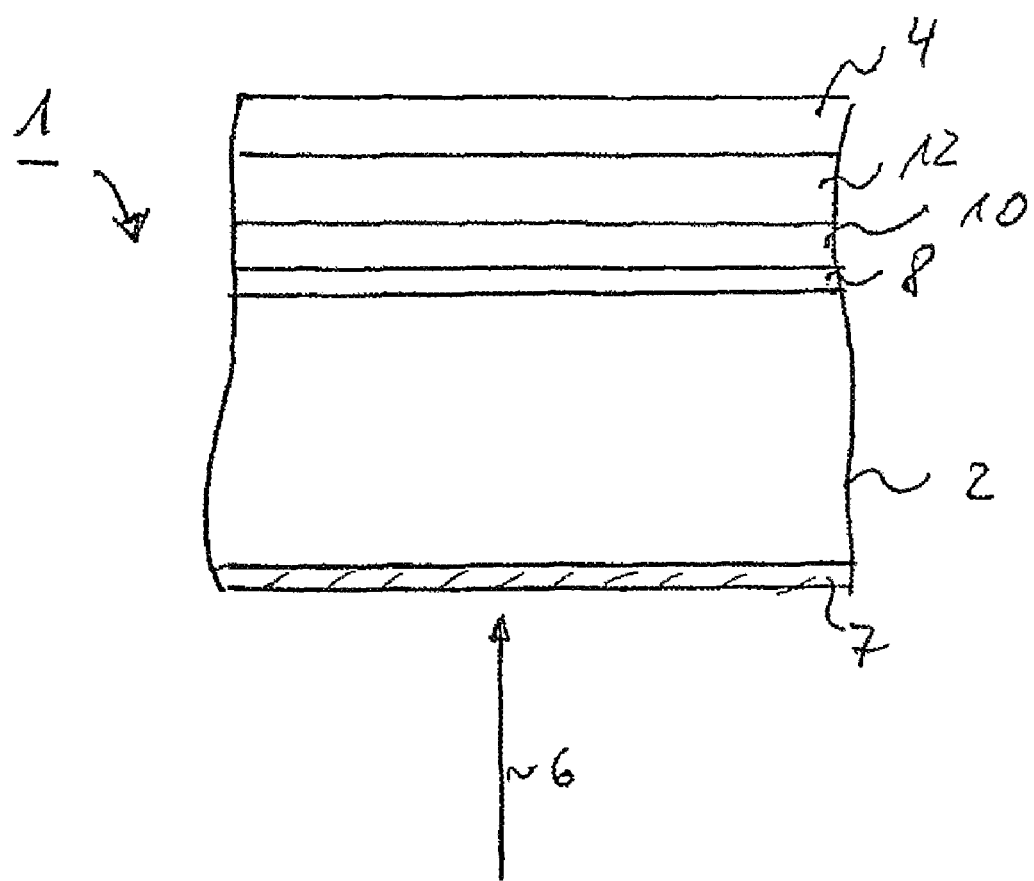
FIG. 3 shows the sectional view of a detail of a rearview mirror provided for application in a motor vehicle.

FIG. 3 is a sectional view of a detail of a rearview mirror 1 provided for application in a motor vehicle. The mirror comprises a layer carrier 2, which in the exemplary embodiment is transparent and made from soda-lime glass. To guarantee the reflecting properties, a reflecting mirror layer 4, made from a suitably chosen metal, is provided. To keep the manufacturing expenditure low, in view of the required corrosion prevention, a so-called alternative reflector material, namely chromium (Cr), has been chosen in the exemplary embodiment; alternatively, however, another suitable reflecting material, such as in particular nickel, titanium or an alloy of these materials could be provided. To protect the mirror layer 4 against damage or impairments through direct atmospheric influences, soiling or the like, the coating is applied on the rear side, i.e. on the side of the layer carrier 2 which is facing away from the viewing direction or direction of incidence of the light indicated by the arrow 6. The front of the layer carrier 2 is provided with a hydrophilic and/or a photocatalytically active coating 7, so that an undesired fogging-up can safely be avoided.

The rearview mirror 1 is suitably designed for observing specifically given optical parameters. For this purpose, the coating applied on the layer carrier 2 comprises, in addition to the reflecting mirror layer 4, an intermediate layer arranged between the minor layer 4 and the layer carrier 2. The intermediate layer for its part has a multilayer structure and comprises a thin metallic layer 8 applied directly on the layer carrier 2, a first dielectric layer 10 applied on said metallic layer 8, and, again in the manner of an additional layer, a second dielectric layer 12 applied on said first dielectric layer 10. On this second dielectric layer 12, the mirror layer 4 is applied.

The transparent metallic layer 8 consists of NiCr and has a thickness of 1 to 21 nm. The first dielectric layer 10 consists of $TiO_2$ or preferably of $SnO_2$, and the second dielectric layer 12 consists of $MgF_2$ or preferably of $SiO_2$. The dielectric layer 12 could also consist of $SnO_2$, if the first dielectric layer 10 has a higher refractive index than the dielectric layer 12. The sum of the layer thicknesses of the first dielectric layer 10 and the second dielectric layer 12 amounts to maximally 250 nm.

Table 1 represents the characteristic optical data of some exemplary embodiments of systems according to the present invention.

TABLE 1

| Color | ds_NiCr [nm] | Material | ds [nm] | ds_SiO2 [nm] | Sum ds | R(A, daylight) | a0 | b0 | C |
|---|---|---|---|---|---|---|---|---|---|
| blue | 2.6 | SnO2 | 51 | 66 | 117 | 47% | −7.5 | −21.0 | 22 |
| green | 14 | SnO2 | 62 | 76 | 139 | 57% | −25 | 5.0 | 25 |
| yellowish red | 3.2 | SnO2 | 63 | 150 | 213 | 46% | 15 | 22 | 27 |
| yellow | 15 | SnO2 | 52 | 147 | 199 | 51% | 5.0 | 30 | 30 |
| yellow | 1.0 | SnO2 | 121 | 55 | 175 | 58% | 2.0 | 14 | 14 |
| red | 2.2 | SnO2 | 84 | 112 | 196 | 50% | 20 | 10 | 22 |
| green | 2.0 | SnO2 | 70.4 | 61.6 | 132 | 64% | −10 | −3 | 10 |

The parameters listed are the color shade of the respective mirror, the thickness ds_NiCr of the metallic layer 8, the material of the first dielectric layer 10, the latter's thickness ds, the thickness ds_SiO2 of the second dielectric layer 12 (material SiO2), the reflection value with illuminant A (photopic vision), the color values a0 and b0 in the Lab color space as well as the above-mentioned parameter C, which is characteristic for the colorfulness.

The layer system can be applied, for example, using common vacuum coating processes (e.g. vaporization, cathode sputtering, ion plating). Sol-gel processes are also suitable, in particular for the dielectric layer.

As layer carrier 2 (substrate), in addition to soda-lime glass, other mineral or organic glasses having the necessary optical transparency can also be used.

The invention claimed is:

1. A rearview mirror for a vehicle comprising:
   a transparent layer carrier; and
   a multilayer coating that includes the following layers, in order of their deposition:
   a transparent metallic layer;
   a first dielectric layer having a first refractive index;
   a second dielectric layer having a second refractive index lower than the first refractive index; and
   a metallic reflecting layer.

2. The rearview mirror as recited in claim 1, wherein the rearview mirror has a maximum reflectance with an illuminant of 70%.

3. The rearview mirror as recited in claim 2, wherein the reflectance is at least 40%.

4. The rearview mirror as recited in claim 2, wherein the reflectance is at least 50%.

5. The rearview mirror as recited in claim 2, wherein the reflecting layer includes at least one of Ni, Ti, Cr and an alloy of these materials.

6. The rearview mirror as recited in claim 5, wherein the reflecting layer includes at least one of Cr and an alloy of Cr.

7. The rearview mirror as recited in claim 1, wherein the transparent metallic layer includes NiCr and has a thickness of 1 to 21 nm.

8. The rearview mirror as recited in claim 1, wherein the first dielectric layer includes $TiO_2$.

9. The rearview mirror as recited in claim 1, wherein the first dielectric layer includes $SnO_2$.

10. The rearview mirror as recited in claim 1, wherein the second dielectric layer includes at least one of $SnO_2$, $MgF_2$ and $SiO_2$.

11. The rearview mirror as recited in claim 1, wherein a sum of thicknesses of the first dielectric layer and the second dielectric layer amounts to maximally 250 nm.

12. The rearview mirror as recited in claim 1, wherein the multilayer coating is disposed on a rear side of the layer carrier.

13. The rearview mirror as recited in claim 12, further comprising a hydrophilic or photocatalytically active coating disposed on a front side of the layer carrier.

14. The rearview mirror as recited in claim 1, having a first CIE color coordinate $a_0$ and a second CIE color coordinate $b_0$ and wherein $\sqrt{(a_0^2+b_0^2)}>5$.

15. The rearview mirror as recited in claim 1, wherein the transparent layer carrier includes soda-lime glass.

* * * * *